United States Patent [19]
Liu

[11] 3,902,256
[45] Sept. 2, 1975

[54] EDUCATIONAL QUIZ AND ANSWER TOY WITH ACTION

[75] Inventor: Hsing-Ching Liu, Taipei, Taiwan, China /Taiwan

[73] Assignees: Hsing-Ching Liu; Hwang Pin Enterprise Co. Ltd.; Magic Manufacturing & Marketing Corporation, all of Taipei, Taiwan, China /Taiwan

[22] Filed: Apr. 2, 1974

[21] Appl. No.: 457,172

[52] U.S. Cl. .................................... 35/9 D; 46/247
[51] Int. Cl. .......................... G09b 1/06; G09b 7/00
[58] Field of Search ............. 35/9 R, 9 C, 9 D, 1, 8, 35/29 R, 29 E; 46/245, 247, 160; 40/106.3, 106.34, 106.35

[56] References Cited
UNITED STATES PATENTS

| | | | |
|---|---|---|---|
| 3,015,895 | 1/1962 | Stall | 35/9 D X |
| 3,106,784 | 10/1963 | Raley | 35/9 C |
| 3,128,575 | 4/1964 | Stanetzki | 46/120 |
| 3,137,079 | 6/1964 | Greuzard | 35/9 D |
| 3,362,103 | 1/1968 | Neumann | 35/9 R X |

*Primary Examiner*—Wm. H. Grieb

[57] ABSTRACT

An educational quiz and answer toy comprising a base portion, an active statue portion mounted on the base portion, a compartment for receiving a quiz plate, a compartment for receiving an answer plate, electrical connections implanted in both the compartments and plates, the toy being arranged such that when a correct answer plate is inserted to match a corresponding quiz plate, a circuit is closed to move a motor actuated crank mechanism within the statue to cause the statue to nod its head and clap.

2 Claims, 8 Drawing Figures

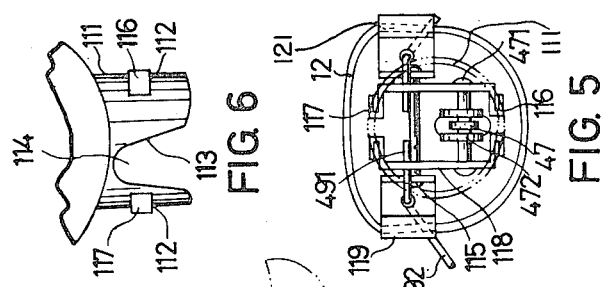
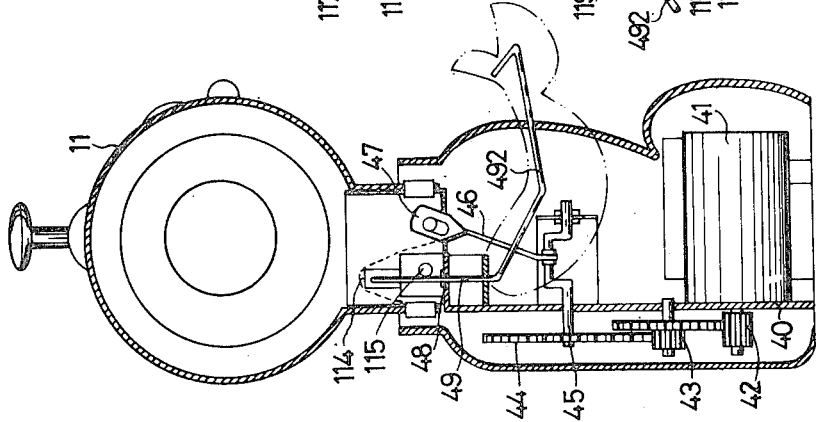
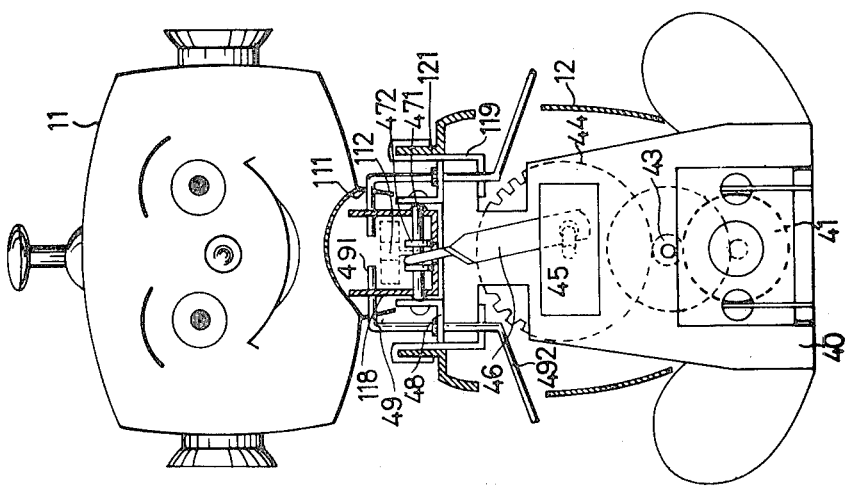

EDUCATIONAL QUIZ AND ANSWER TOY WITH ACTION

The present invention relates generally to an educational toy and more particularly to a quiz and answer toy.

A lot of quiz and answer toys are available on the market. Some of them show a lighting effect when the answer is correct. However, none of them gives both action and sound effect simultaneously.

According to the present invention there is provided an educational quiz and answer toy comprising a base portion, an active statue portion mounted on the base, a compartment for receiving a quiz plate, a compartment for receiving an answer plate, electrical connections implanted in both the cavity and plates, the toy being arranged such that when a correct answer plate is inserted to match a corresponding quiz plate, the circuit is closed to move a motor actuated crank mechanism within the statue to cause the statue to nod its head and clap.

The invention will now be described in more detail, by way of example only, with reference to the accompanying drawings in which:

FIG. 3 is a cut away front view of the same embodiment showing the mechanism giving an action and sound effect;

FIG. 4 is a cut away side view corresponding to FIG. 3;

FIG. 5 is a top view of the mechanism with the head of the statue cut off;

FIG. 6 is a partial side view of the neck portion of the statue;

Figure 2:
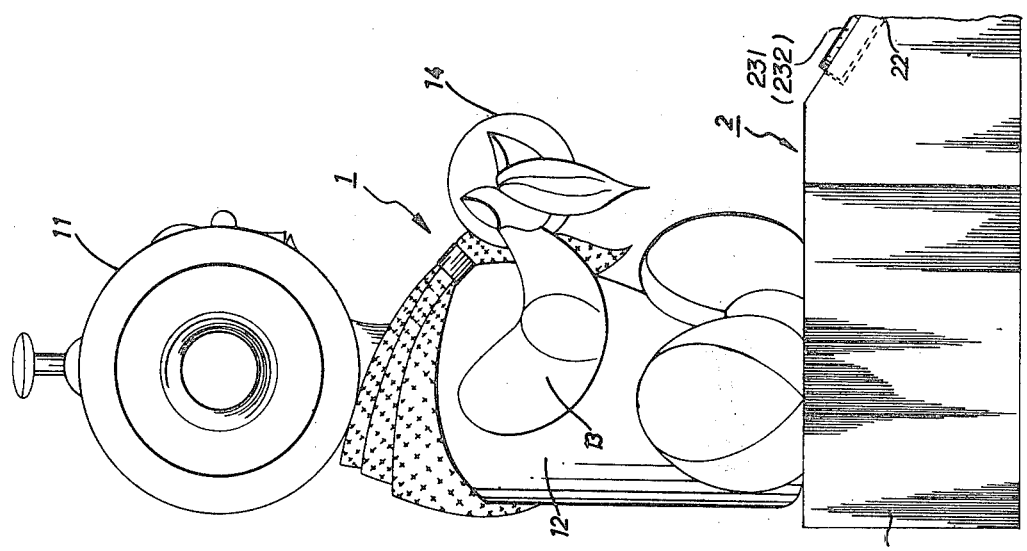
FIG. 2 is a side view of the same embodiment.
Figure 1:
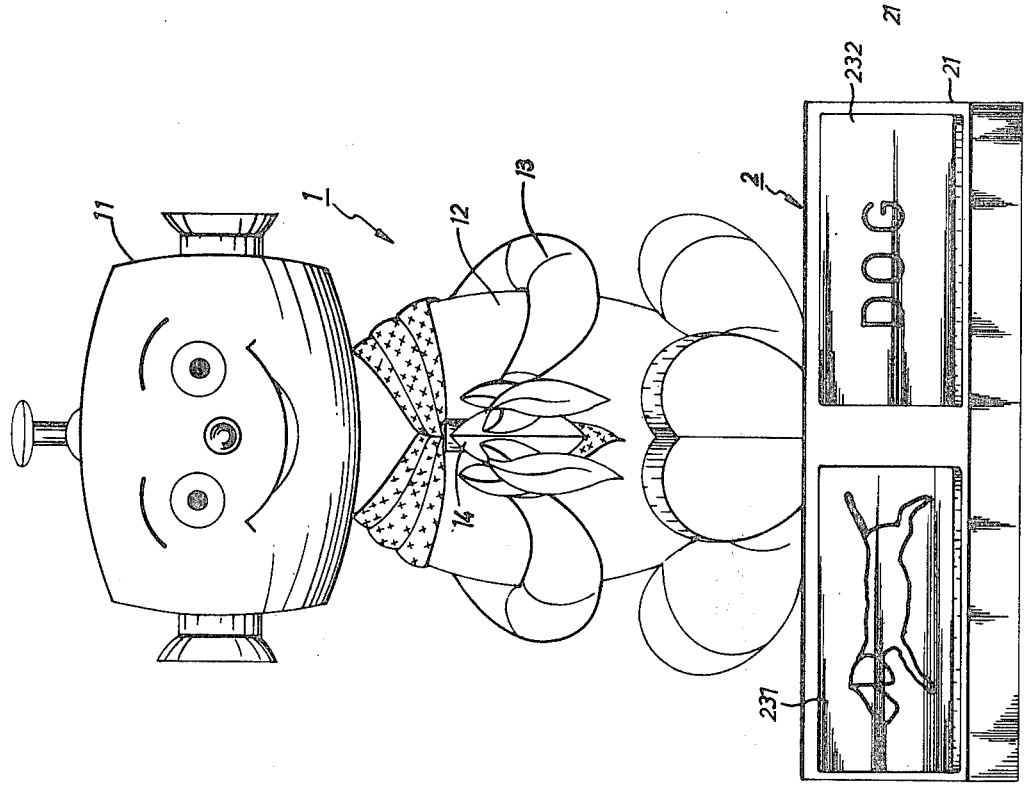
FIG. 1 is a front view of a preferred embodiment of a quiz and answer toy.

Referring to FIGS. 1 and 2, the quiz and answer toy of the present invention is composed of a statue 1 sitting on a base 2. The statue is made to imitate a sort of robot having a head 11, a body 12, two arms 13—13 and a pair of cymbals 14 held in its hands.

Base 2 has a base compartment 21 wherein batteries are to be placed. A cavity 22 which is divided into a left and a right portion, is inclinedly disposed in front of the statue. The left part of the cavity 22 is adapted to receive a quiz plate 231 and the right part an answer plate 232.

The mechanism for giving action and sound effects is shown in FIGS. 3 to 5. The appearance or outer case of the robot-like statue is made of material such as moulded plastic. The head 11 has a neck 111, with front and rear openings 112—112 supported on members 116 and 117 respectively which extend outwardly from inside metal bracket 118. The neck has at its sides clearances 114, the edges 113 of which serve as a push-pull member when the robot nods its head up and down. The body 12 with legs crossed sitting on the base 2 has shoulders 121 clamped into bracket 119 formed integrally with a vertical mounting plate 40.

Figure 7:
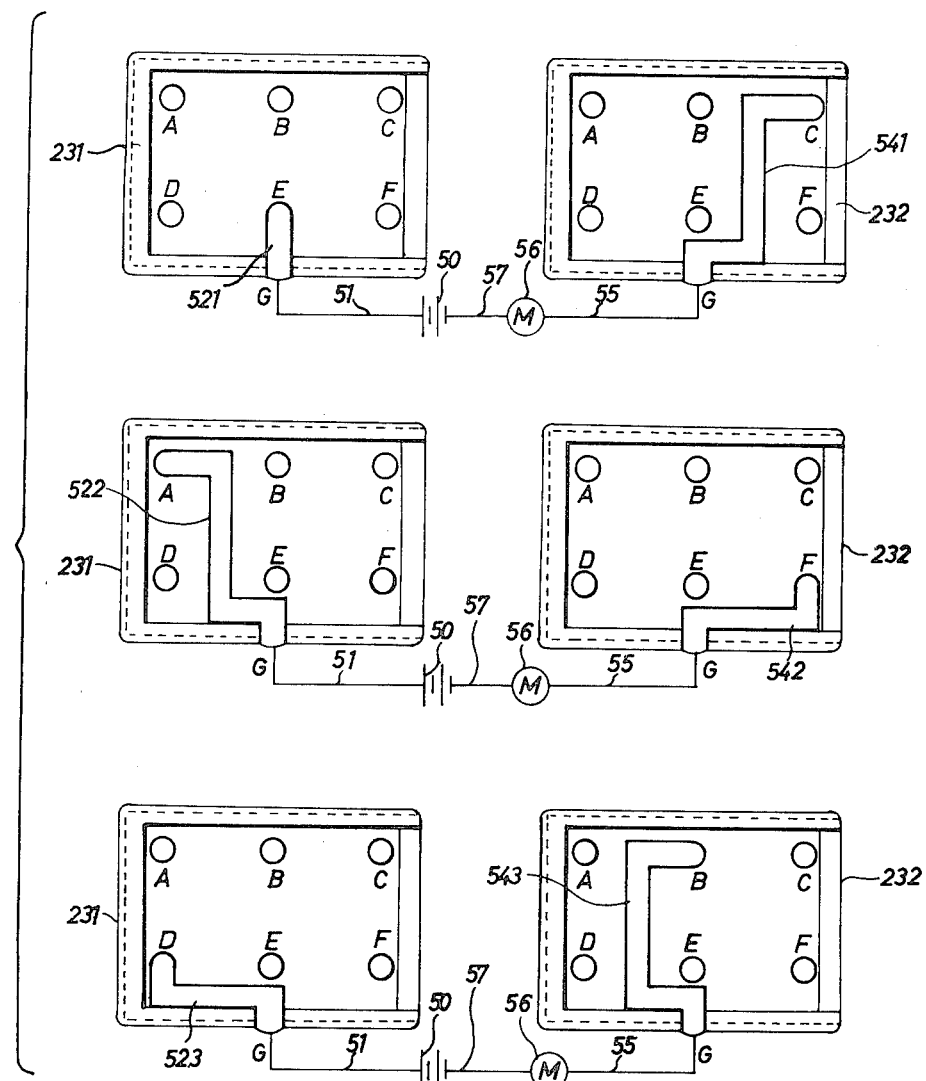
FIG. 7 shows pairs of quiz and answer plates and inner connection of the circuit.

The motion of the toy is actuated by a motor 41 which is in a circuit including the circuit in the base cavity and on the quiz and answer plates (FIG. 7). On the vertical mounting plate 40 from bottom to top are mounted, successively, a motor 41, and a gear train consisting of gears 42-43-44. The action is then transmitted to a crankshaft 45 and to the connecting rod 46. The upper end of the connecting rod 46 is connected to a pin joint 47 which is located at the front portion of the neck and on the bracket 118. The pin joint 47 has two ends 471—471, and a pair of guides 472—472 to guide the upper end of connecting rod 46. Also on the bracket 118 at a rear portion is a pivot pin 115 serving as a pivot centre of a head nodding action when crankshaftconnecting rod set 45-46-47 is in motion.

During the nodding action of the head when in an up-down motion, the front and rear edges 113 of the neck clearances 114 reciprocate the upper arm lever 491 on arm shaft 49 which is mounted on the upper bending portion 48 of the vertical mounting plate 40. The backward-foreward motion of the upper arm lever 491 in turn forces the fore arm lever 492 to give a hand clapping movement to the robot. The pair of cymbals then emit a sound.

Figure 8:
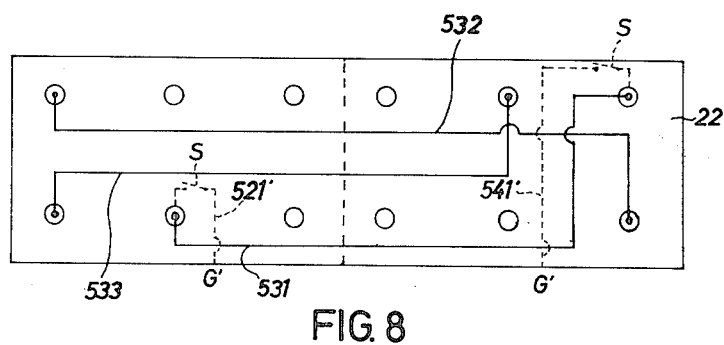
FIG. 8 shows the inner connection of the circuit implanted in the base cavity where quiz and answer plates are to be inserted.

The abovesaid gives an illustration of the working mechanism. The circuit involved is shown in FIGS. 7 and 8. If this is a "Diagram-word" quiz and answer set, one diagram is given on each quiz plate and one answering word on each answer plate. Each matched pair of quiz and answer plates closes the circuit to start the motor.

In FIG. 7 three matched pairs of quiz and answer plates are shown as examples. Each plate may be formed as a picture frame with quiz card (diagram) and answer card (word) inserted, respectively. Assume, in the uppermost pair (referring to FIG. 1), a diagram or picture of a dog on a quiz card is inserted into the quiz plate frame 231, and an answer card with the word "DOG" printed on it is inserted into the answer plate frame 232. At the bottom of each plate, in this embodiment, six terminals or dots A, B, C, D, E, F are disposed. In the uppermost pair, dot E on the quiz plate 231 and dot C on answer plate 232 are chosen as a match and comprise a part of the circuit. No matter which dot is chosen it is always led to the front edge of its frame where a terminal G is provided.

When a matched pair of quiz and answer plates 231-232 are inserted into the base cavity 22 (considering the uppermost pair in FIG. 7 in connection with FIG. 8), the complete circuit is composed of a battery 50, a lead 51 from battery 50 to terminal G of quiz plate 231, an inner connection 521 from terminal G of plate 231 to dot E on it, an implanted inner connection 531 in cavity 22, an inner connection 541 in answer plate 232 from dot C to terminal G of plate 232, a lead 55 from terminal G of plate 232 to motor 56, and a lead 57 from motor 56 to battery 50.

Considering the middle pair of FIG. 7, for example, dot A on plate 231 and dot F on plate 232 are selected and designed as a pair. The circuit is composed of battery 50-lead 51-connection 522 on plate 231-connection 532 in cavity 22-connection 542 on plate 232-lead 55-motor 56-lead 57-battery 50.

As for the lowest pair in FIG. 7, the circuit is composed of components 50–51-523-533-543-55-56-50.

For the inner connections either on quiz and answer plates 231 and 232 or in cavity 22, (like 521, 522, 523, or 541, 542, 543, or 531, 532, 533) the printed circuit technique may be utilized to simplify manufacturing and reduce the cost.

In this embodiment only six dots are provided in each quiz or answer plate. As many dots as desirable may be used insofar as the space of the plate permits. Many variations other than the Diagram-word category could also be used so that the versatility is very great.

Another embodiment may be illustrated by taking the upper-most pair in FIG. 7, i.e. the dots E-C pair, incorporated with the dotted portion of 521' and 541' in FIG. 8. Simply eliminate inner connection 521 in plate 231 and 541 in plate 232 so that no terminal E, G; G, C would be exposed outside the plates 231 and 232 to obtain a smooth appearance of the plates. Enclosed inside the plates 231, 232, under each dot E and C is a mini-size magnet respectively. In FIG. 8 circuits 521', 541' (as shown in dotted line) are added which are led to be connected to circuits 51, 55, respectively through terminals G', G'. Under each dot E and C a magnetic-sensitive switch S, S is provided. Thus, when plates 231 and 232 are placed in match, magnets under dots E-C would close the circuit to give the same effects as aforementioned.

When playing, the teacher or child selects a quiz plate from a pile of quiz plates and inserts it into the left part of the cavity 22. He then selects an answer plate from another pile of answer plates and inserts it into the right part of the base cavity 22. If the pair matches, in other words the answer is correct, the circuit is closed to actuate the motor and the robot statue nods its head and clasps the cymbals in its hand. If the answer is incorrect no action or sound effect is shown.

The described educational toy of the quiz and answer type gives both an action and sound effect of a statue so as to increase the interest in learning and the results achieved.

The above embodiments are given only for illustrative purposes and not by way of limitation and modifications will become evident to those skilled in the art which will fall within the scope of the attached claims.

What we claim is:

1. An educational quiz and answer toy comprising a base portion, an active statue portion having a head mounted on the base portion, a compartment for receiving a quiz plate, a compartment for receiving an answer plate, electrical connections implanted in both the compartments and plates, and a motor actuated crank mechanism within the statue comprising a train of gears, a crankshaft, a connecting rod, a pin point in a neck of the statue, a bracket for supporting the neck and head, and a pivot so that when the crankshaft rotates, the head of the statue nods up and down, the toy being arranged such that when a correct answer plate is inserted to match a corresponding quiz plate, a circuit is closed to move said motor actuated crank mechanism to cause the statue to nod its head.

2. An educational quiz and answer toy comprising a base portion, an active statue portion having a head mounted on the base portion, a compartment for receiving a quiz plate, a compartment for receiving an answer plate, electrical connections implanted in both the compartments and plates, the toy being arranged such that when a correct answer plate is inserted to match a corresponding quiz plate, a circuit is closed to move a motor actuated crank mechanism within the statue to cause the statue to nod its head, said head having a neck provided with clearances at the sides thereof, an upper arm lever in operative association with each clearance and disposed on a mounting plate, and a fore arm lever connected to each upper arm lever, whereby when the head nods said clearances cause said upper arm levers to reciprocate, which motion is transmitted to said fore arm levers to cause a clapping action.

* * * * *